US008615921B1

(12) United States Patent
Weems

(10) Patent No.: US 8,615,921 B1
(45) Date of Patent: Dec. 31, 2013

(54) THERMALLY INSULATED VEST FOR USE WITH MODIFIED BAIT STORING BUCKET

(76) Inventor: Guy Weems, Mount Dora, FL (US)

( * ) Notice: Subject to any disclaimer, the term of this patent is extended or adjusted under 35 U.S.C. 154(b) by 338 days.

(21) Appl. No.: 13/089,366

(22) Filed: Apr. 19, 2011

(51) Int. Cl.
A01K 97/05 (2006.01)
(52) U.S. Cl.
USPC ..... 43/56; 43/55; 62/371; 62/372; 220/592.2; 220/592.21; 220/592.23; 220/592.24; 220/592.26; 220/915.2
(58) Field of Classification Search
USPC ................ 43/55–57; 62/371, 372; 220/592.2, 220/592.21, 592.23, 592.24, 592.25, 220/592.26, 592.01, 915.2
See application file for complete search history.

(56) References Cited

U.S. PATENT DOCUMENTS

| 1,476,230 A | * | 12/1923 | Thompson | 43/55 |
| 1,579,560 A | * | 4/1926 | Moore | 43/55 |
| 1,709,424 A | * | 4/1929 | Zohe | 43/56 |
| 1,883,135 A | * | 10/1932 | Walker et al. | 43/56 |
| 1,942,756 A | * | 1/1934 | Howard | 43/56 |
| 2,255,134 A | * | 9/1941 | Thomas | 43/56 |
| 2,272,561 A | * | 2/1942 | Hubbell | 43/56 |
| 2,328,993 A | * | 9/1943 | Norling | 43/55 |
| 2,432,042 A | * | 12/1947 | Richard | 62/273 |
| 2,489,710 A | * | 11/1949 | Bride et al. | 43/56 |
| 2,497,014 A | * | 2/1950 | Renfro, Sr. | 43/57 |
| 2,572,763 A | * | 10/1951 | Robertson | 43/55 |
| 2,575,893 A | * | 11/1951 | Seaman | 43/55 |
| 2,613,472 A | * | 10/1952 | Ebert | 43/56 |
| 2,673,454 A | * | 3/1954 | Gallie et al. | 43/56 |
| 2,680,424 A | * | 6/1954 | Brown | 43/55 |
| 2,716,834 A | * | 9/1955 | De Bonville et al. | 43/55 |
| 2,740,546 A | * | 4/1956 | Kowalski | 43/56 |
| 2,899,103 A | * | 8/1959 | Ebert | 43/55 |
| 2,954,891 A | * | 10/1960 | Imber | 220/592.2 |
| 3,236,206 A | * | 2/1966 | Willinger | 43/55 |
| 3,452,469 A | * | 7/1969 | White | 43/55 |
| 3,468,289 A | * | 9/1969 | Broida | 43/55 |
| 3,553,880 A | * | 1/1971 | Splickan et al. | 43/55 |
| 3,566,836 A | * | 3/1971 | Elfert | 43/55 |
| 3,603,019 A | * | 9/1971 | Smeltzer | 43/56 |
| 3,654,773 A | * | 4/1972 | White | 62/371 |
| 3,882,628 A | * | 5/1975 | Stouder | 43/55 |
| 4,096,657 A | * | 6/1978 | Morrow | 43/56 |
| 4,413,481 A |   | 11/1983 | Thomas | |
| 4,450,647 A | * | 5/1984 | Schmidt | 43/55 |
| 4,513,525 A | * | 4/1985 | Ward et al. | 43/56 |
| 4,831,842 A | * | 5/1989 | Kelley et al. | 62/372 |
| 4,864,769 A | * | 9/1989 | Sandahl | 43/56 |

(Continued)

FOREIGN PATENT DOCUMENTS

JP 05056735 A * 3/1993 ............ A01K 97/05
JP 10215746 A * 8/1998 ............ A01K 97/05

(Continued)

Primary Examiner — Darren W Ark

(57) ABSTRACT

The thermally insulated vest for use with a modified bait storing bucket is an improvement over existing bait buckets in that it includes a thermally insulated vest that adorns an exterior surface of the bucket. The thermally insulated vest is comprised of a plurality of layers consisting of a plastic mesh, foil liner, insulation, and gel pack. At least two freezer packs adorn an exterior surface of the thermally insulated vest, and aid in cooling the contents of the bucket. The bucket includes a drain hole and plug to evacuate fluids from within. A lid having a lid vent rests atop the bucket, and is secured thereon via securing means. The thermally insulated vest has a height less than the height of the vest.

6 Claims, 4 Drawing Sheets

(56) References Cited

U.S. PATENT DOCUMENTS

| | | | |
|---|---|---|---|
| 5,005,374 A * | 4/1991 | Spitler | 62/372 |
| 5,102,004 A * | 4/1992 | Hollander et al. | 220/592.25 |
| D333,068 S | 2/1993 | Williams | |
| 5,319,877 A * | 6/1994 | Hagan | 43/56 |
| 5,361,603 A * | 11/1994 | Merritt-Munson | 220/592.26 |
| 5,481,823 A * | 1/1996 | Hoover et al. | 43/55 |
| 5,507,114 A * | 4/1996 | Stricker | 43/55 |
| 5,619,867 A * | 4/1997 | Slaughter | 62/371 |
| 6,119,476 A * | 9/2000 | Slaughter et al. | 62/371 |
| 6,151,910 A * | 11/2000 | Hazen | 62/371 |
| 6,237,765 B1 * | 5/2001 | Hagen et al. | 43/55 |
| 6,330,808 B1 * | 12/2001 | Kouwenberg et al. | 62/372 |
| 6,422,032 B1 * | 7/2002 | Greene | 62/457.2 |
| 6,990,765 B1 * | 1/2006 | Beech | 43/56 |
| 7,219,465 B2 * | 5/2007 | Beech | 43/55 |
| 7,377,071 B1 * | 5/2008 | Thompson | 43/56 |
| 7,517,013 B1 * | 4/2009 | Lowe | 297/180.11 |
| 8,209,995 B2 * | 7/2012 | Kieling et al. | 220/915.2 |
| 2002/0020104 A1 * | 2/2002 | Kolar et al. | 43/55 |
| 2004/0244271 A1 | 12/2004 | Farmer et al. | |
| 2006/0016119 A1 * | 1/2006 | Ashburn et al. | 43/56 |
| 2007/0261977 A1 * | 11/2007 | Sakai | 43/54.1 |
| 2008/0028667 A1 * | 2/2008 | Grzybowski | 43/57 |
| 2010/0270317 A1 * | 10/2010 | Kieling et al. | 220/592.25 |
| 2011/0031254 A1 * | 2/2011 | Mortarotti | 220/592.2 |

FOREIGN PATENT DOCUMENTS

| | | | | |
|---|---|---|---|---|
| JP | 2001148986 A * | 6/2001 | | A01K 97/05 |
| JP | 2002186393 A * | 7/2002 | | A01K 97/05 |
| JP | 2003153644 A * | 5/2003 | | A01K 97/20 |

* cited by examiner

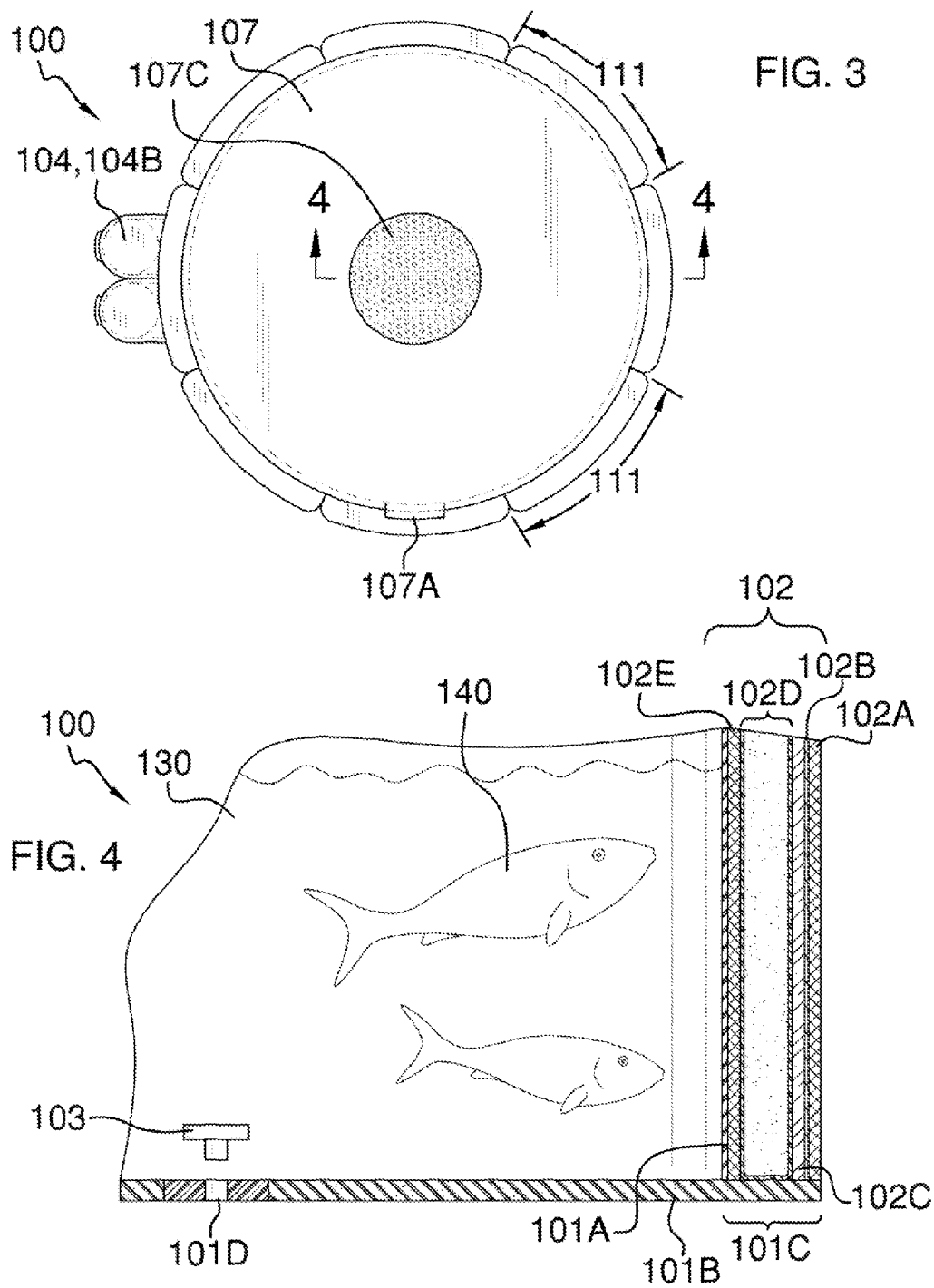

THERMALLY INSULATED VEST FOR USE WITH MODIFIED BAIT STORING BUCKET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of bait buckets, more specifically, a bait bucket that has insulated vest encircling said bucket in order to keep the contents at a reduced temperature.

B. Discussion of the Prior Art

As will be discussed immediately below, no prior art discloses a modified bait bucket specifically suited for storing live bait used in fishing at a reduced or cooled temperature; wherein the bucket includes a thermally insulated vest that encircles the exterior of the bucket; wherein the vest has a height less than the overall height of the bucket; wherein the thermally insulated vest includes removable freeze packs along an exterior that aid in cooling the interior of the bucket; of layers designed to insulate the bucket; wherein a lid is engaged atop said bucket and includes a vent and securing means.

The Farmer et al. Patent Application Publication (U.S. Pub. No. 2004/0244271) discloses a bait bucket having an insulated lining that can be filled with liquid and frozen to keep the bait cool. However, the bait bucket is not a cylindrical bucket having an insulating vest encircling the exterior of said bucket and in which The Hagen et al. Patent (U.S. Pat. No. 6,237,765) discloses a bait bucket having a cooling chamber for receiving ice or the like. Again, the bait bucket is not a cylindrical bucket having a thermally insulated vest that encircles a portion of the exterior of the bucket.

The Slaughter et al. Patent (U.S. Pat. No. 6,119,476) discloses a bait bucket having compartments for holding chilled gelatinous packs. Again, the bait bucket is not a cylindrical bucket that includes a thermally insulated vest encircling a lower portion of the exterior of the bucket and of which has removable freeze packs that aid in cooling the contents of the bucket.

The Stricker Patent (U.S. Pat. No. 5,507,114) discloses a night crawler container having an insulated cooling medium to maintain the bait at a desired temperature. However, the container does not teach a thermally insulated vest encircling a lower exterior of the bucket.

The Thomas Patent (U.S. Pat. No. 4,413,481) discloses a portable beverage cooler comprising a wrap-around having a cavity for receiving a flexible cold pack. However, the beverage cooler is not a modified bait bucket that has a thermally insulated vest encircling an exterior of the bucket.

The Greene Patent (U.S. Pat. No. 6,422,032) discloses a multi-walled cooler bag for maintaining a cool temperature within the bag. However, the cooler bag does not include a thermally insulating vest that encircles an exterior surface of a bucket, which is limited to a lower portion of the bucket.

While the above-described devices fulfill their respective and particular objects and requirements, they do not describe a modified bait bucket specifically suited for storing live bait used in fishing at a reduced or cooled temperature; wherein the bucket includes a thermally insulated vest that encircles the exterior of the bucket; wherein the vest has a height less than the overall height of the bucket; wherein the thermally insulated vest includes removable freeze packs along an exterior that aid in cooling the interior of the bucket; wherein the thermally insulated vest is composed of a plurality of layers designed to insulate the bucket; wherein a lid is engaged atop said bucket and includes a vent and securing means. In this regard, the thermally insulated vest for use with modified bait storing bucket departs from the conventional concepts and designs of the prior art.

SUMMARY OF THE INVENTION

The thermally insulated vest for use with a modified bait storing bucket is an improvement over existing bait buckets in that it includes a thermally insulated vest that adorns an exterior surface of the bucket. The thermally insulated vest is comprised of a plurality of layers consisting of a plastic mesh, foil liner, insulation, and gel pack. At least two freezer packs adorn an exterior surface of the thermally insulated vest, and aid in cooling the contents of the bucket. The bucket includes a drain hole and plug to evacuate fluids from within. A lid having a lid vent rests atop the bucket, and is secured thereon via securing means. The thermally insulated vest has a height less than the height of the vest.

An object of the invention is to provide a bucket that is specifically suited for storing live bait in a cold or chilled aqueous water solution so as to prolong the storage life of the live bait.

A further object of the invention is to provide a thermally insulated vest that adorns an exterior surface of the bucket, and of which is comprised of a series of layers that are designed to insulate the bucket.

An even further object of the invention is to include a thermally insulated vest that has a height less than that of the bucket, which is designed to prevent overcooling of the water solution inside of the bucket.

An object of the invention is to provide pockets along an exterior of the thermally insulated vest that may enable a freezer pack(s) to be stored thereon, which aids in chilling the bucket.

An object of the invention is to provide a lid that rests atop the bucket, and which has a vent hole to enable oxygen to enter the interior and to enable carbon dioxide and other gases to be released from the interior.

An even further object of the invention is to include a drain hole and plug that enables the contents of the bucket to be evacuated all together or to maintain a desired water level within the bucket.

These together with additional objects, features and advantages of the thermally insulated vest for use with a modified bait storing bucket will be readily apparent to those of ordinary skill in the art upon reading the following detailed description of presently preferred, but nonetheless illustrative, embodiments of the thermally insulated vest for use with a modified bait storing bucket when taken in conjunction with the accompanying drawings.

In this respect, before explaining the current embodiments of the thermally insulated vest for use with a modified bait storing bucket in detail, it is to be understood that the thermally insulated vest for use with a modified bait storing bucket is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the thermally insulated vest for use with a modified bait storing bucket.

It is therefore important that the claims be regarded as including such equivalent construction insofar as they do not depart from the spirit and scope of the thermally insulated vest for use with a modified bait storing bucket. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates a top view of the bait bucket in which the lid is seated atop the bucket, and wherein the pockets adorning the exterior of the thermally insulated vest include the freeze packs within as indicated by broken lines;

FIG. 4 illustrates a cross-sectional view of the bait bucket along line 4-4 in FIG. 3, and detailing the plurality of layers composing the thermally insulated vest as well as depicting the drain hole along a bottom surface of the bucket.

DETAILED DESCRIPTION OF THE EMBODIMENT

Figure 1:
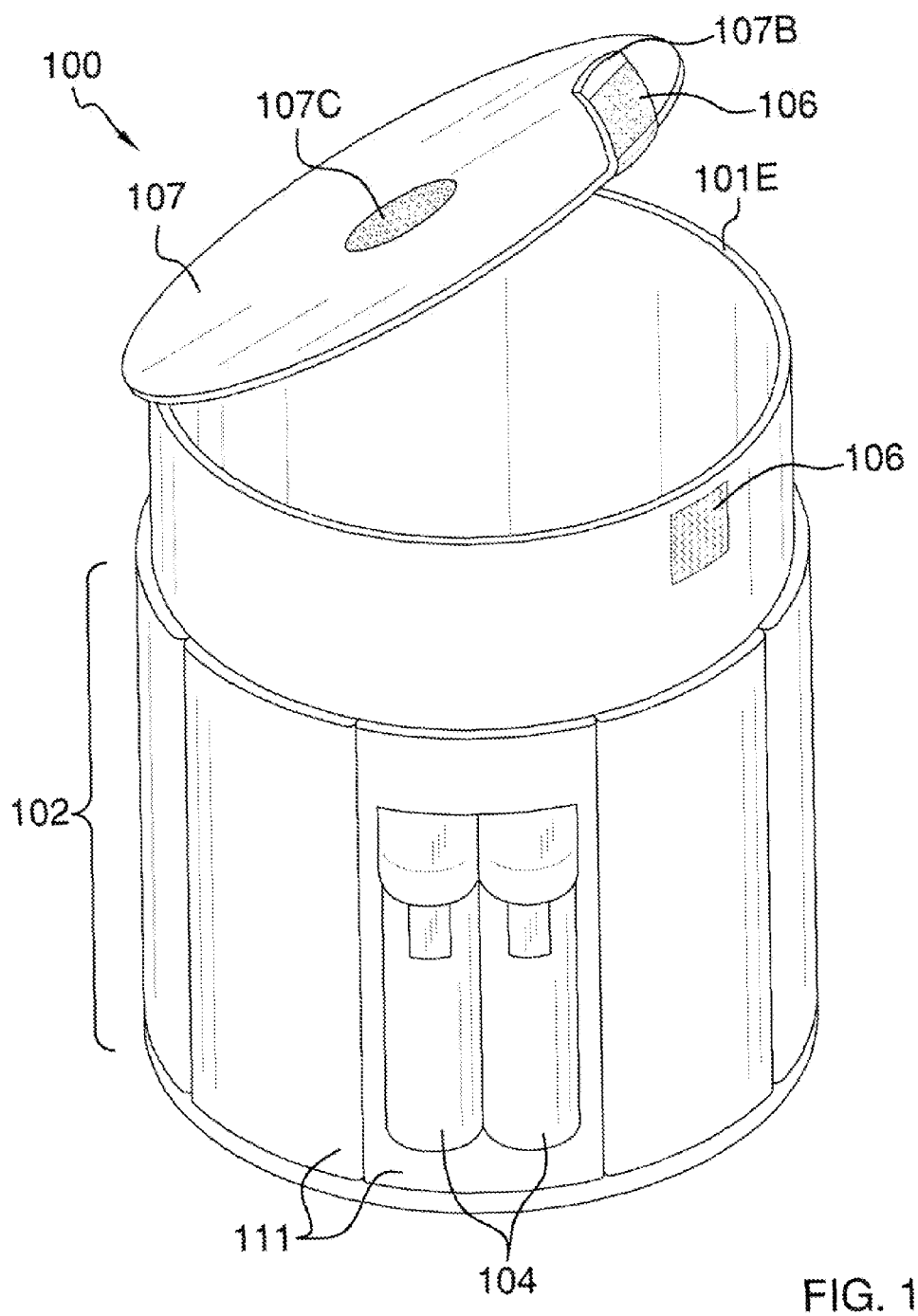
FIG. 1 illustrates a front, perspective view of the bait bucket in which the pockets adorning the exterior of the thermally insulated vest are closed off, and wherein the lid is angled atop the bucket.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A thermally insulated vest for use with a modified bait storing bucket 100 (hereinafter invention) includes a bucket 101, which is a commonly known item that has been modified to store live bait 140 within a water solution 130.

The bucket 101 includes a thermally insulated vest 102, which adorns a wall 101A (hereinafter exterior surface) of the bucket 101. The thermally insulated vest 102 is comprised of a plurality of layers, which are depicted in FIG. 4. The thermally insulated vest 102 includes a first layer 102A, which is a plastic mesh that acts as a defining boundary as to the overall exterior shape of the thermally insulated vest 102. The thermally insulated vest 102 includes a second layer 102B, which is a foil liner that may be made of a thermally reflective foil that is typically associated with aluminum and other applicable metals. However, it shall be noted that the foil liner may be a foil material that is a veneer situated upon a semi-flexible substrate.

The thermally insulated vest 102 includes a third layer 102C, which is composed of an insulating material that will restrict the flow of heat transfer either from outside inward or inward to outside.

The thermally insulated vest 102 includes a fourth layer 102D, which is a gel pack layer that is essentially a layer of gel suspended within a flexible lining.

The thermally insulated vest 102 includes a fifth layer 102E, which essentially defines an interior of the thermally insulated vest 102. The fifth layer 102E is a semi-flexible material, and is composed of the same material as the first layer 102A.

The bucket 101 is further defined by a bottom 101B that has a diameter greater than the diameter formed by the exterior surface 101A. The thermally insulated vest 102 is seated around the exterior surface 101A. The thermally insulated vest 102 is seated atop a lip 101C formed between the bottom 101B and the exterior surface 101A.

The bottom 101B includes a drain hole 101D that is sealably engaged upon by a drain plug 103. The drain hole 101D and the drain plug 103 enable the water solution 130 to be evacuated altogether or to adjust an overall water level within the bucket 101.

Adorning an exterior of the first layer 102A is at least two pockets 104. The pockets 104 are each designed to accommodate a single freeze pack 105. The pockets 104 include an opening 104A atop the pocket 104 through which the freeze pack 105 is inserted or removed. The pocket 104 includes a cover 104B that folds over the opening 104A to enclose the contents therein. Both the pocket 104 and the cover 104B include securing means 106 to secure the cover 104B over the opening 104A. The securing means 106 are identified as nylon hook and loop strips, which are well known in the art and when engaged upon act to secure two items together.

The thermally insulated vest 102 has an overall height 102' that is less than an overall height 101' of the bucket 101. The thermally insulated vest 102 is designed to insulate or to chill or cool the contents of the bucket 101 to a prescribed height along the bucket 101. That being said an upper region 110 includes a distance of the bucket 101, which is not encircled by the thermally insulated vest 102.

The pockets 104 have a height 104' that is less than the height 102' of the thermally insulated vest 102.

Figure 2:
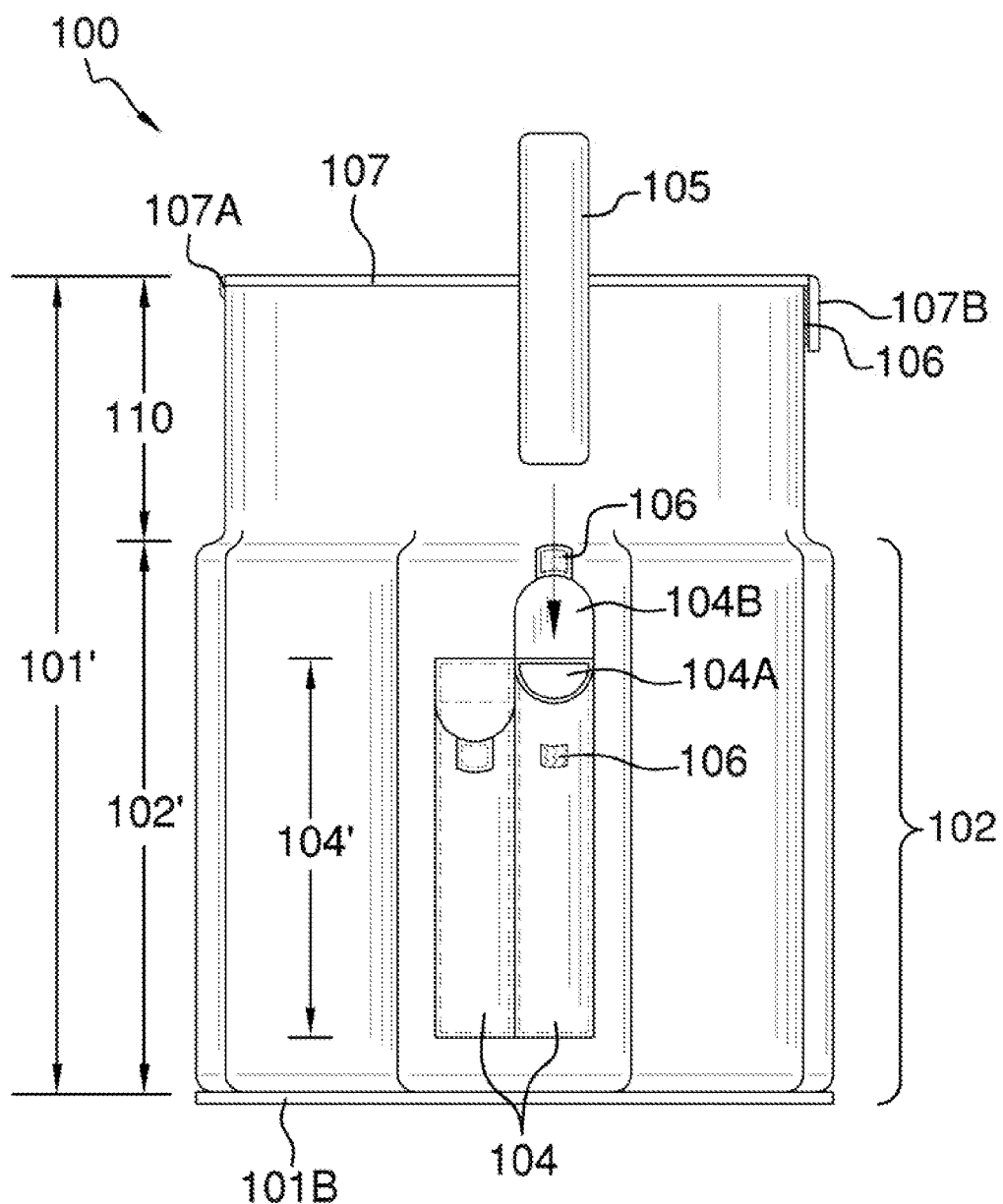
FIG. 2 illustrates a side view of the bait bucket in which one of the pockets along the exterior of the thermally insulated vest is opened and a removable freeze pack is aligned above, and the lid is seated atop the bucket.

Looking at the thermally insulated vest 102 in FIGS. 1-3, it is apparent that the thermally insulated vest 102 is divisible into a plurality of zones 111. Each zone 111 has all of the layers of the thermally insulated vest 102. The individual zones 111 individually provide thermal insulating qualities, which increase the overall efficiency of the thermally insulated vest 102.

The bucket 101 has a top edge 101E that defines the overall height 101' of the exterior surface 101A. A lid 107 adorns the top edge 101E, and enables the bucket 101 to be closed off from the outside. The lid 107 is attached to the bucket 101 via a hinge 107A. The hinge 107 enables the lid 107 to open and expose the top edge 101E from a seated position as depicted in FIGS. 2 and 3. A tab 107B extends down from a side opposite of the hinge 107A. The tab 107B and the exterior surface 101A include securing means 106, which enable the lid 107 to be secured atop the bucket 101. The lid 107 is a circularly-shaped object that includes a vent hole 107C centrally located thereon. The vent hole 107C enables air to enter and exit atop the bucket 101. More importantly, the vent hole 107C enables oxygen to enter into the bucket 101, and allows carbon dioxide and other gases to be expelled from the bucket 101.

Figure 5:
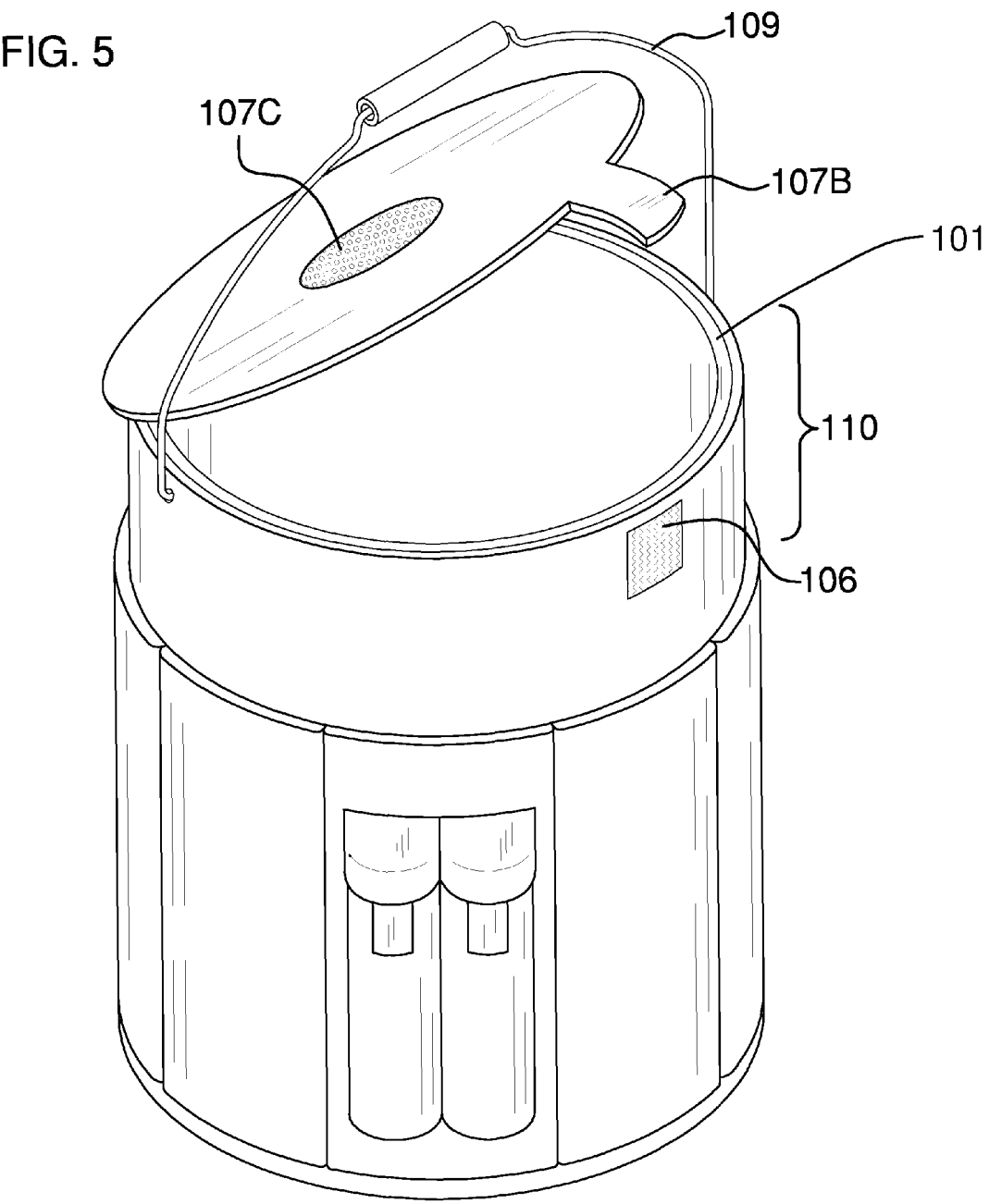
FIG. 5 illustrates an embodiment of the bait bucket, which includes a handle that aids in lifting the bait bucket.

Referring to FIG. 5, the bucket 101 includes a handle 109 that is attached on each side of the exterior wall 101A, and can rotate to a vertical position in order to carry the invention 100.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A thermally insulated vest in combination with a modified bait storing bucket comprising:
   a bucket upon which a thermally insulated vest adorns an exterior surface thereof;
   wherein said bucket is configured to store a water solution and live bait within and of which the temperature of the water solution is maintained or chilled via the thermally insulated vest;
   wherein a lid is hingedly attached atop the bucket and includes a vent hole so as to enable ventilation inside of the bucket;
   wherein the bucket includes a handle;
   wherein the thermally insulated vest is comprised of a plurality of layers; wherein a first layer of said plurality of layers is an outermost layer composed of a plastic mesh;
   wherein the thermally insulating vest includes a second layer of said plurality of layers composed of a foil liner made of a thermally reflective foil;
   wherein the thermally insulated vest includes a third layer of said plurality of layers composed of an insulating material;
   wherein the thermally insulated vest includes a fourth layer of said plurality of layers that is a gel pack layer comprised of a layer of gel suspended within a flexible lining;
   wherein the thermally insulated vest includes a fifth layer of said plurality of layers comprised of a plastic mesh;
   wherein at least two pockets adorn an exterior of the first layer of the thermally insulated vest; wherein each of the at least two pockets can store a single freeze pack;
   wherein the at least two pockets each include an opening atop the pocket through which the freeze pack is inserted or removed; wherein each pocket includes a cover that folds over the opening to enclose the contents therein;
   wherein the at least two pockets and the respective covers each include securing means to secure the covers over the openings; wherein the securing means are nylon hook and loop strips;
   wherein the bucket includes a bottom having a diameter greater than a diameter of the exterior surface of the bucket, which forms a lip upon which the thermally insulated vest is seated;
   wherein the bottom includes a drain hole and removable drain plug that can be used to evacuate all or some of the water solution.

2. The thermally insulated vest in combination with a modified bait storing bucket as described in claim 1, wherein the thermally insulated vest has an overall height that is less than an overall height of the bucket.

3. The thermally insulated vest in combination with a modified bait storing bucket as described in claim 2, wherein the at least two pockets have a height that is less than the overall height of the thermally insulated vest.

4. The thermally insulated vest in combination with a modified bait storing bucket as described in claim 1, wherein the thermally insulated vest is divisible into a plurality of zones.

5. A thermally insulated vest in combination with a modified bait storing bucket comprising:
   a bucket upon which a thermally insulated vest adorns an exterior surface thereof;
   wherein the bucket includes a handle that attaches on each side of the bucket and rotates vertically for use in lifting the bucket;
   wherein said bucket is configured to store a water solution and live bait within and of which the temperature of the water solution is maintained or chilled via the thermally insulated vest;
   wherein a lid is hingedly attached atop the bucket and includes a vent hole so as to enable ventilation inside of the bucket;
   wherein the thermally insulated vest is comprised of a plurality of layers; wherein a first layer of said plurality of layers is an outermost layer composed of a plastic mesh;
   wherein the thermally insulating vest includes a second layer of said plurality of layers composed of a foil liner made of a thermally reflective foil;
   wherein the thermally insulated vest includes a third layer of said plurality of layers composed of an insulating material;
   wherein the thermally insulated vest includes a fourth layer of said plurality of layers that is a gel pack layer comprised of a layer of gel suspended within a flexible lining;
   wherein the thermally insulated vest includes a fifth layer of said plurality of layers comprised of a plastic mesh;
   wherein at least two pockets adorn an exterior of the first layer of the thermally insulated vest; wherein each of the at least two pockets can store a single freeze pack; wherein the at least two pockets each include an opening atop the pocket through which the freeze pack is inserted or removed; wherein each pocket includes a cover that folds over the opening to enclose the contents therein; wherein the at least two pockets and the respective covers each include securing means to secure the covers over the openings; wherein the securing means are nylon hook and loop strips;

wherein the bucket includes a bottom having a diameter greater than a diameter of the exterior surface of the bucket, which forms a lip upon which the thermally insulated vest is seated; wherein the bottom includes a drain hole and removable drain plug that can be used to evacuate all or some of the water solution;

wherein the thermally insulated vest has an overall height that is less than an overall height of the bucket;

wherein the at least two pockets have a height that is less than the overall height of the thermally insulated vest.

6. The thermally insulated vest in combination for use with a modified bait storing bucket as described in claim 5, wherein the thermally insulated vest is divisible into a plurality of zones.

\* \* \* \* \*